June 19, 1945. E. C. WEISKOPF 2,378,672
PROJECTION AND VIEWING APPARATUS
Filed Oct. 3, 1942 2 Sheets-Sheet 1
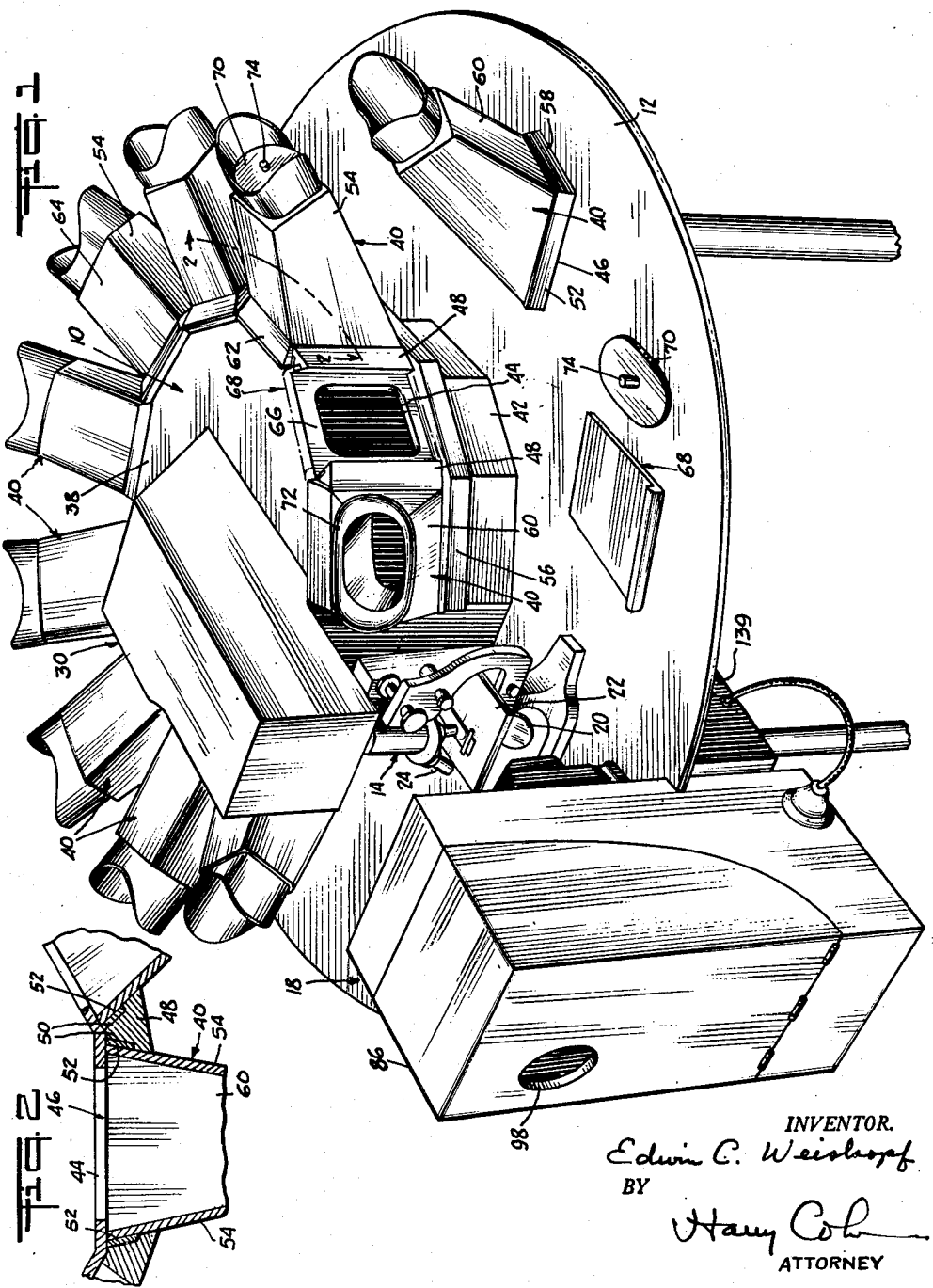
INVENTOR.
Edwin C. Weiskopf
BY
Harry Cohn
ATTORNEY June 19, 1945. E. C. WEISKOPF 2,378,672
PROJECTION AND VIEWING APPARATUS
Filed Oct. 3, 1942 2 Sheets-Sheet 2
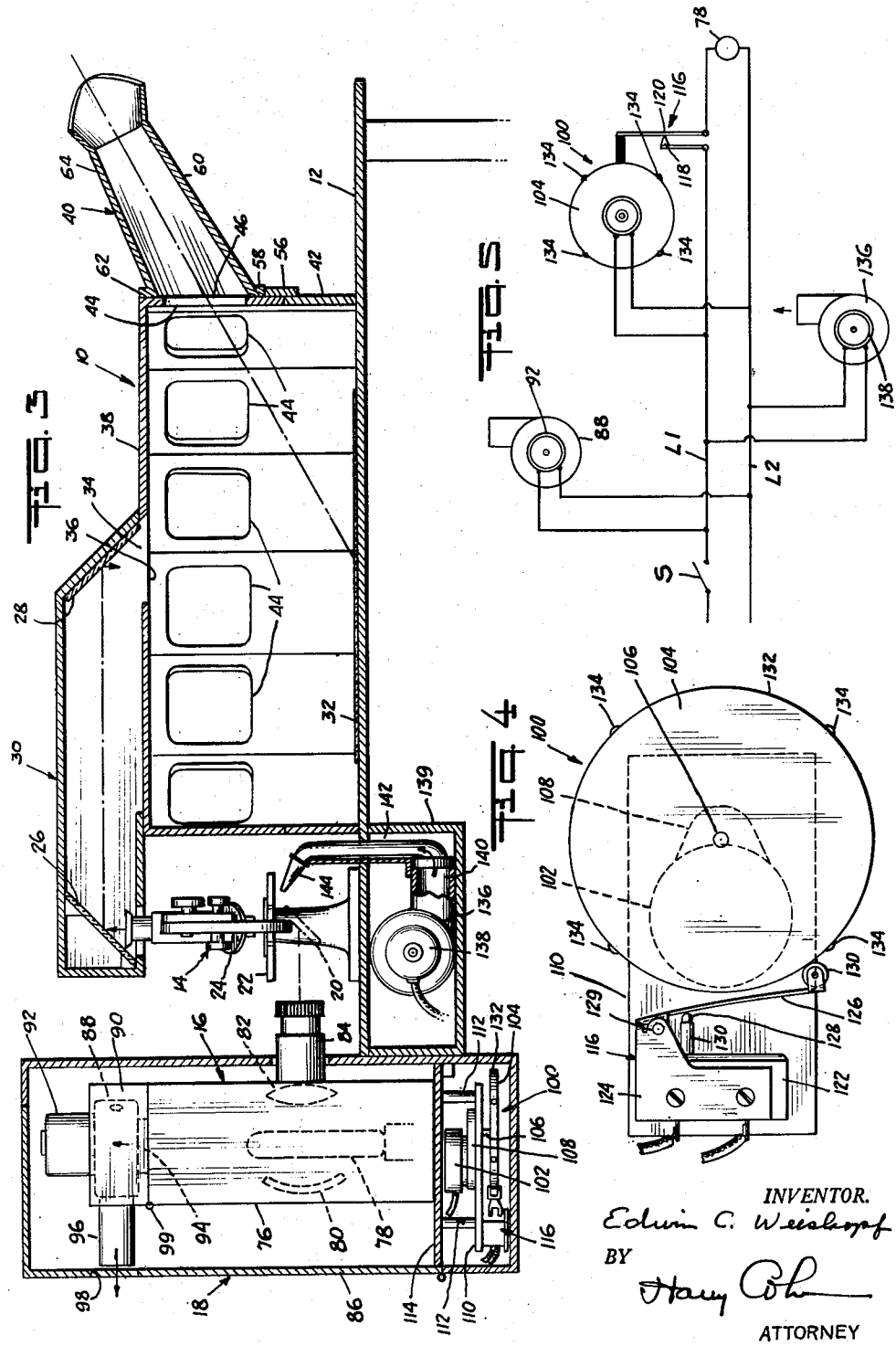
INVENTOR.
Edwin C. Weiskopf
BY
Harry Cohn
ATTORNEY Patented June 19, 1945

2,378,672

UNITED STATES PATENT OFFICE 2,378,672

PROJECTION AND VIEWING APPARATUS

Edwin C. Weiskopf, New York, N. Y.

Application October 3, 1942, Serial No. 460,595

8 Claims. (Cl. 88—24)

This invention relates to improvements in microprojector and viewing apparatus of the type in which an image projected into a chamber may be viewed simultaneously by a plurality of persons grouped around said chamber externally thereof in a room which may be illuminated.

Apparatus of the above indicated type, wherein the image of a micro-slide or other object is projected into a chamber provided with a plurality of viewing openings, requires the use of a lamp of high power in the light projector in order to provide proper illumination of the image in the chamber. The required power of the lamp is so high that the heat of the light beam concentrated on the micro-slide by the condensing lens of the substage of the microscope is sufficient to greatly impair or destroy the slide or the specimen carried thereby.

It is, therefore, an object of this invention to eliminate this serious disadvantage and objection. More particularly, in accordance with the present invention and pursuant to this object thereof, provision is made in the apparatus for preventing the projected light beam from overheating the slide in the microscope while at the same time enabling the use of a lamp of higher power than was heretofore possible in group-viewing apparatus of the chamber type.

Another object is to provide a viewing chamber which is constructed and arranged to provide a variable number of viewing openings. The viewing chamber is, therefore, so constructed in accordance with this object of the invention that it is provided with a plurality of viewing tubes demountably secured to said chamber in registry with companion openings in said chamber, provision being made for closing said openings when said viewing tubes are detached from said chamber. Thus, for example, when the apparatus is designed for use by a predetermined number of persons but is used by a smaller number, several of said viewing tubes can be easily removed from the chamber thereby providing more room and comfort for the smaller group at the table on which the chamber is mounted and at the same time the chamber openings from which said viewing tubes have been removed can be readily closed to prevent the passage of light into or out of said chamber through such openings.

A further object of the invention is to provide means for cooling the lamp in the light projector of the apparatus, as a result of which the life of the lamp is substantially prolonged.

A yet further object is generally to provide an improved micro-projector and viewing apparatus of the viewing chamber type, such as that shown in U. S. Patent 2,133,321.

The above and other objects, features and advantages of the present invention will be fully understood from the following description considered in connection with the accompanying illustrative drawings.

In the drawings:

Fig. 1 is a perspective view of the apparatus embodying the present invention, one of the viewing tubes detached from the chamber, a closure for the opening of the chamber at the place of the removed tube, and a cover for an attached viewing tube resting on the table;

Fig. 2 is a detail sectional view on the line 2—2 of Fig. 1;

Fig. 3 is a vertical sectional view of the apparatus with parts in elevation;

Fig. 4 is a bottom plan view of part of the apparatus;

Fig. 5 is a circuit diagram.

Referring now to the drawings in detail, there is shown an image viewing chamber 10 mounted on a table 12 in juxtaposition to a microscope 14 which receives light from a projector 16 (Fig. 3) in a cabinet 18 supported by said table in any suitable way. The microscope can be of any suitable type and as here shown is provided with the usual adjustable mirror 20, for directing the light axially of the microscope for illuminating the object or slide mounted on the usual support or stage 22, and the usual lens holder 24. The light beam from the source of light is projected by mirror 20 through the usual sub-stage (not shown) of the microscope and through the slide on support 22 and through the microscope tube for projecting the image of the object on the slide to the spaced light reflecting mirrors 26 and 28 in a longitudinally extending light transmitting and reflecting chamber 30. The image is reflected by mirror 26 in a direction at a right angle to the axis of the microscope and by mirror 28 downwardly into chamber 10 onto a suitable screen 32 on which said image is viewed. Chamber 30 is completely closed except for a bottom opening 34 which registers with an opening 36 in the top wall 38 of chamber 9. The image on screen 32 can be viewed simultaneously by a group of persons through the viewing tubes 40 arranged peripherally of chamber 10. The construction of chamber 10 and the viewing tubes 40 will now be more particularly described.

The viewing chamber 10, which may be made of wood or of any other suitable materials, is of generally polygonal or circular form peripherally of its vertical wall 42 and is completely closed, except at opening 36, the bottom of said chamber being closed by the top of table 12 on which said chamber rests. Said vertical wall 42 is provided with a plurality of viewing openings 44 which are disposed in the upper part of said wall. A viewing tube 40 is removably mounted on wall 42 in registry with each opening 44 in said wall. The inner end 46 of each viewing tube lies in a plane which is at an acute angle to a horizontal plane (for example, the plane of screen 32) and said viewing tube projects upwardly and outwardly from vertical wall 42.

Said viewing tubes are also preferably made of wood and are removably mounted on wall 42 in registry with openings 44, respectively, and for this purpose vertical guide members are fixed to wall 42 at opposite sides of openings 44. Said guide members 48 have grooves 50 in which ribs 52 fixed to the opposite sides 54 of the viewing tube at the inner end 46 thereof are slidably received. A horizontal ledge 56 is fixed to wall 44 near the lower edge of each opening 44 and is engaged by a rib 58 fixed to the lower wall 60 of the viewing tube at the inner end 46 thereof. A rib 62 is fixed to upper wall 64 of the viewing tube near the inner end 46 thereof an dengages the part 66 of wall 42 above opening 44. This construction provides a light-proof joint between each viewing tube and the companion viewing opening 44 of chamber 10. The upper and lower walls 64 and 60 of each viewing tube converge toward the outer end of the tube so that the opening at said end is smaller than the companion chamber opening 44. Also, as clearly shown by the drawings, the bottom wall 60 of the viewing tube has a greater inclination than the top wall 64 of said tube, in relation to vertical wall 42 of the chamber, so that the viewing tubes can extend sufficiently from said vertical wall to provide adequate spaces between adjacent tubes at their outer ends to make room for the observers using the apparatus and at the same time the height of the outer end of the tube above table 12 is kept low enough to enable the observers to be comfortably positioned while looking into said tubes.

When a viewing tube is removed, the opening 44 is closed by a closure or shutter plate 68 which is slidably received in vertical guides 48. When a viewing tube mounted on vertical wall 42 is not used at a time when other viewing tubes are used, it is closed at its outer end by a closure member 70 which fits removably into said viewing tube and rests against the peripheral shoulder 72 at the outer end thereof. Said closure member 70 is provided with a knob 74 to facilitate insertion and removal of said closure member. It will be understood chamber 10 is protected as much as possible against the passage of light thereinto or therefrom, substantially all light being excluded except, of course, the image projecting light passing into said chamber from light reflecting and transmitting chamber 30. Further, in this connection, it will be understood that when a viewing tube is in use, the person using the same substantially prevents the passage of light through the outer end of the viewing tube by placing his face close to said end while observing the image on screen 32.

It will be noted that the provision for mounting the viewing tubes 40 removably in position permits the apparatus to be utilized to the full capacity determined by the number of viewing openings but that when the apparatus is used by a group which is smaller than the maximum capacity group, a corresponding number of viewing tubes can be easily removed, thus providing more room at the table 12 for the group making use of the apparatus. In the full viewing capacity of the apparatus, the viewing tubes are placed as close to each other as possible in order to keep down to a minimum the peripheral size of the viewing apparatus and this, on the one hand, limits the space available at the table for each person of the group using the apparatus, while on the other hand, this arrangement makes possible the use of the apparatus by a comparatively large group. However, since the apparatus may at times be used by a group smaller than that of the maximum capacity group, the removability of the viewing tubes permits the persons of the first mentioned group to have more room and comfort in making use of the apparatus.

As hereinbefore stated, an intense light is desirable for projecting the image of the slide or object through the microscope and onto the screen 32 in viewing chamber 10, but the heat of the light beam concentrated by the light projector and mirror 22 of the microscope on the slide or object is very high, when adequate light is provided, resulting in impairment or destruction of said slide or object. In accordance with the present invention provision is made for preventing impairment of or damage to the slide or object by the heat of the projected light beam. The means for accomplishing this important advantageous result will be described presently following a more detailed description of the light projector and devices associated therewith.

The light projector 16 can be of any suitable type and, as here shown, comprises a lamp housing 76 in which there is mounted an electric lamp 78, a reflector 80, a condensing lens 82 and an adjustable lens tube 84 through which the light beam is projected onto mirror 20 of the microscope 14. Said projector is mounted in cabinet 18 which is preferably made of wood or is otherwise constructed to afford protection against the heat of lamp housing 76 to the users of the apparatus or to others who might otherwise touch or be near said lamp housing. Cabinet 18 is provided with a pivoted closure 86, for convenient access to the interior of the cabinet. A suction pump or fan 88 is mounted in the pivoted top cover 90 of lamp casing 76 and is operated by an electric motor 92 for exhausting the heated air from said lamp casing, the intake 94 of said fan communicating with the interior of casing 76 and the outlet of said fan communicating with a tube 96 which registers at its outlet end with an opening 98 in cabinet 18. Lamp 78 is thereby cooled and its active life prolonged by a great many hours beyond its life when it is not cooled. Cover 88 is pivoted at 99 to lamp casing 76 and may be opened for access to the interior of said casing and of said cover.

In order to prevent the heat of the projected light beam from impairing the slide or object, provision is made in this apparatus for extinguishing lamp 78 during short intervals of time during the use of the apparatus for projecting an image of the slide or object into chamber 10 and during said use of the apparatus, in accordance with the preferred embodiment of the invention, a current of cool air is directed in heat-exchange relation with the slide. More specifically, said cooling air is blown against the bottom of the micro-slide support 22 of the microscope.

The means for thus extinguishing the lamp comprises a device 100. Said device which, as here shown, is mounted in the lower part of cabinet 18 comprises an electric clock-motor 102 and a disk 104 rotated thereby through a shaft 106 actuated by suitable reduction gearing positioned in a housing 108. Said clock motor and reduction gearing constitute a unit which does not, per se, form part of the present invention, any electric clock-motor and reduction gearing unit being suitable. Said unit is mounted on a supporting plate 110 mounted by studs 112 removably secured to a support 114 in cabinet 18.

Disk 100, which as here shown is positioned below said plate, operates a micro-switch 116 for making and breaking the circuit of lamp 78. Said switch comprises normally closed companion contact members 118 and 120, shown diagrammatically in Fig. 5, positioned within an insulation casing 122 (Fig. 4) carried by plate 110. A bracket 124 is fixed to said casing and carries an arm 126 which engages a rod 128 which is slidable in a sleeve 130 carried by casing 122, said rod being spring pressed outwardly by the micro-switch and being moved inwardly by arm 126 for opening said switch. Arm 126 is pivoted at one end thereof to bracket 116 by a spring hinge indicated generally at 129 and at its other end is provided with a roller which engages resiliently the peripheral edge 132 of rotary disk 104, being held at all times in said resilient engagement by said spring hinge 128. Disk 104 is provided at said peripheral edge 132 with circumferentially spaced small radial projections 134 of slight extent circumferentially of said edge of the disk. As here shown, there are four projections 134 and they are equally spaced circumferentially of disk 104 so that for each revolution of said disk switch 116 is opened four times by the engagement of roller 130 by said projections. Preferably, disk 104 makes one revolution per hour so that micro-switch 116 is opened four times during one hour and of course extinguishes the projector lamp 78 the same number of times, said switch being closed and the lamp energized during the engagement of roller 130 with the peripheral portions of edge 132 between adjacent projections 134. While the period of time during which the lamp is extinguished may vary, it is sufficient to extinguish the lamp each time for about forty-five seconds, i. e. for about three or four minutes altogether during one hour of continuous operation of the apparatus.

The means for cooling the slide or object on support 22 of the microscope during the operation of the apparatus comprises a blower fan 136 operated by an electric motor 138 continuously during the use of the apparatus. Said motor-operated blower is mounted in a cabinet 139 supported by table 12. The outlet 140 of said fan communicates with a tube 142 which is provided at its outlet end with a nozzle 144 (Fig. 3). Said nozzle is inclined upwardly to direct a stream of cool air against the bottom of stage or support 22 of the microscope and through the opening in said stage against the slide thereby to cool the slide or object positioned on the stage.

By reference to Fig. 5, it will be noted that motors 92 and 138 are connected to the electric supply lines L1 and L2 so that they are energized at all times when the main switch S is closed, i. e., when switch 116 is open as well as when said switch 116 is closed. Thus, a stream of cool air is directed against support 22 to cool the slide or object continuously during the use of the apparatus for projecting an image of said slide or object. Similarly, the heated air is exhausted continuously from lamp casing 76 during said use of the apparatus.

While I have shown and described the preferred embodiment of my invention, it will be understood that the latter may be embodied otherwise than as herein shown or described, and that in the illustrated embodiment certain changes in the details of construction and in the arrangement of parts may be made without departing from the underlying idea of this invention. Accordingly, I do not wish to be limited to the construction herein specifically shown or described except to the extent which may be required by the scope of the appended claims.

Having thus described my invention, what I claim and desire to secure by Letters Patent is:

1. Apparatus of the character described comprising a chamber provided with a screen onto which an image is projected from outside the chamber, said chamber having a generally circular peripheral vertical wall and a top wall, said vertical wall being provided with a series of openings therethrough positioned above said screen and below said top wall and arranged peripherally of said vertical wall, and a plurality of viewing tubes mounted on said vertical wall, externally thereof, in registry with said openings, respectively, in optical alignment with said screen and inclined upwardly and outwardly therefrom, said openings being in closely spaced relation around said vertical wall and said tubes projecting to points spaced such distance from said wall that the outer ends of said tubes are in sufficiently spaced relation to permit observers to position themselves in side by side relation to look into said tubes while the inner ends of said tubes are adjacent each other at said vertical wall.

2. Apparatus of the character described comprising a chamber provided with a screen onto which an image is projected from outside the chamber, said chamber having a peripheral vertical wall provided with a series of peripherally spaced openings therethrough, said openings being located above the plane of said screen and a plurality of viewing tubes removably mounted on said vertical wall, externally thereof, in registry with said openings, respectively, and in optical alignment with said screen and vertical guides on said wall at opposite sides of each of said openings, said guides being open at the upper ends thereof, said tubes having inner end portions slidably received in said guides through the open upper ends thereof, the inner ends of said tubes being held by said guides in abutting relation to said vertical wall at said openings, respectively.

3. Apparatus of the character described comprising a chamber provided with a screen onto which an image is projected from outside the chamber, said chamber having a generally circular peripheral vertical wall and a top wall, said vertical wall being provided with a series of openings therethrough located above the plane of said screen and below said top wall and arranged around said vertical wall, and a plurality of viewing tubes mounted on said vertical wall, externally thereof, and extending outwardly therefrom in registry with said openings, respectively and in optical alignment with said screen, said openings being in closely spaced relation around said vertical wall and said tubes projecting to points spaced such distance from said wall that the outer ends of said tubes are in sufficiently spaced relation to permit observers to position themselves in side by side relation to look into said tubes while the inner ends of said tubes are adjacent each other at said vertical wall 4. Apparatus of the character described comprising a chamber provided with a screen onto which an image is projected from outside the chamber, said chamber having a peripheral vertical wall and a top wall, said vertical wall being provided with a plurality of peripherally spaced openings therethrough below said top wall and above the plane of said screen, and a series of viewing tubes removably mounted on said vertical wall, externally thereof, and extending outwardly therefrom in registry with said openings, respectively and in optical alignment with said screen, guides fixed to said vertical wall for holding said tubes removably in position with the inner ends of said tubes abutting said vertical wall, and means removably mountable in said guides for closing the opening from which a viewing tube is removed.

5. Apparatus of the character described comprising a chamber provided with a screen onto which an image is projected from outside the chamber, said chamber having a generally circular peripheral vertical wall and a top wall, said vertical wall being provided with a plurality of openings therethrough below said top wall and above the plane of said screen, and a series of viewing tubes mounted on said vertical wall, externally thereof, in registry with said openings, respectively, and inclined upwardly and outwardly therefrom in optical alignment with said screen, each of said tubes having upper and lower wall portions disposed in converging relation toward the outer ends of said tubes, respectively, and said lower wall having a greater upward inclination than said upper wall in relation to said vertical wall of the chamber, said openings being in closely spaced relation around said vertical wall and said tubes projecting to points spaced such distance from said wall that the outer ends of said tubes are in sufficiently spaced relation to permit observers to position themselves in side by side relation to look into said tubes while the inner ends of said tubes are adjacent each other at said vertical wall.

6. Apparatus of the character described comprising a chamber provided with a screen onto which an image is projected from outside the chamber, said chamber having a generally circular peripheral vertical wall provided with a series of openings therethrough arranged around said wall and located below the top of said chamber and above the plane of said screen, and a plurality of viewing tubes removably mounted on said vertical wall, externally thereof, in optical alignment with said screen and registry with said openings, respectively, and projecting radially from said peripheral vertical wall and vertical guides on said wall at opposite sides of each of said openings, said tubes having inner end portions slidably received in said guides and held thereby with the inner ends of the tubes abutting said wall at said openings, respectively, said tubes having longitudinally extending wall portions extending outwardly and upwardly from said vertical wall, the outer ends of said tubes being more widely spaced from each other than said inner ends.

7. Apparatus of the character described comprising a chamber provided with a screen onto which an image is projected from outside the chamber, said chamber having a generally circular peripheral vertical wall having a series of angularly related wall portions each provided with an opening therethrough, said opening being almost as wide as the companion wall portion, and located in said wall portion above the plane of said screen and below the top of the chamber and a plurality of viewing tubes mounted on said wall portions, respectively, and extending outwardly therefrom in optical alignment with said screen with the inner ends of said tubes in registry with said openings, respectively, the inner open ends of said tubes being substantially as large as said wall openings, said tubes having longitudinal walls extending outwardly from said vertical wall portions, respectively, to points spaced such distance radially from said vertical wall that the outer ends of said tubes are substantially more widely spaced from each other than said inner ends thereof, the spaces between adjacent viewing tubes at the outer ends thereof being wide enough to permit observers to position themselves in side by side relation while the inner ends of the tubes are closer to each other than said outer ends.

8. Apparatus of the character described comprising a chamber provided at the lower part thereof with a screen onto which an image is projected from outside the chamber, said chamber having a generally circular peripheral vertical wall having a plurality of angularly related wall portions each provided with an opening therethrough, said opening being almost as wide as the companion wall portion, and located in said wall portion above the plane of said screen and below the top of the chamber and a plurality of viewing tubes mounted on said wall portions, respectively, and extending outwardly therefrom in optical alignment with said screen with the inner ends of said tubes in registry with said openings, respectively, the inner open ends of said tubes being substantially as large as said wall openings, said tubes having longitudinal walls extending outwardly from said vertical wall portions, respectively, to points spaced such distance radially from said vertical wall that the outer ends of said tubes are substantially more widely spaced from each other than said inner ends thereof, the spaces between adjacent viewing tubes at the outer ends thereof being wide enough to prmit observers to position themselves in side by side relation while the inner ends of the tubes are closer to each other than said outer ends, said tubes being inclined upwardly from said vertical wall portions so that the lines of sight extend downwardly from the outer ends of said tubes toward the screen in said chamber.

EDWIN C. WEISKOPF.